United States Patent Office 3,037,374
Patented June 5, 1962

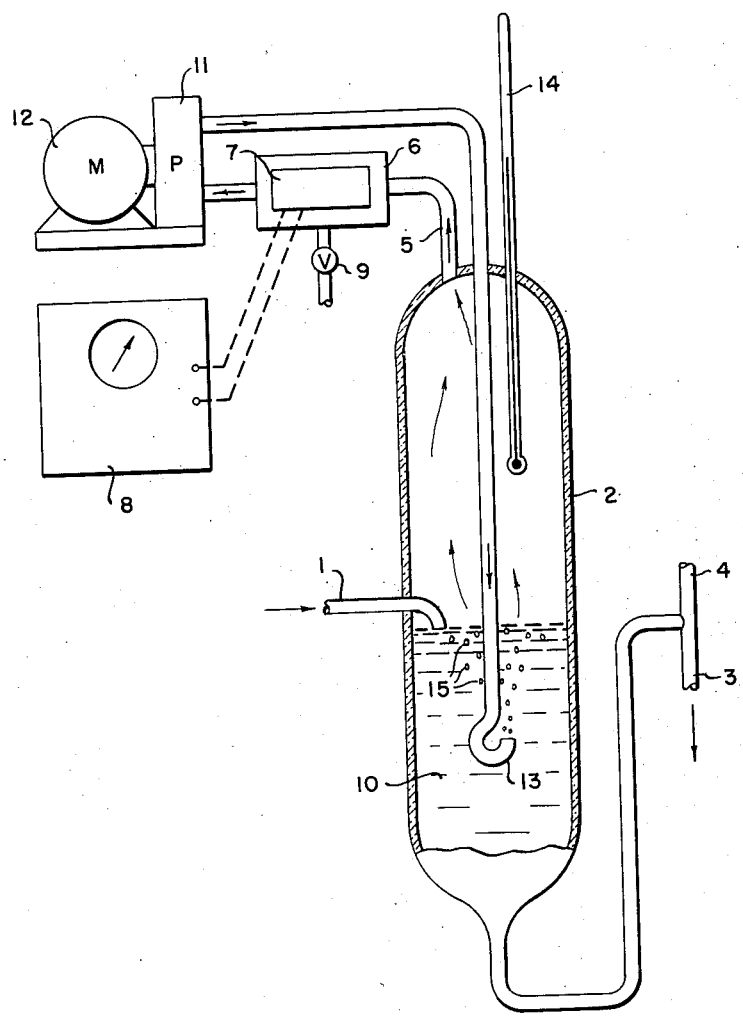

3,037,374
DISSOLVED WATER ANALYZER
Harry Messinger, 305 Sumner Road, Annapolis, Md.
Filed Aug. 14, 1959, Ser. No. 833,892
2 Claims. (Cl. 73—53)
(Granted under Title 35, U.S. Code (1952), sec. 266)

The invention described herein may be manufactured and used by or for the Government of the United States of America for governmental purposes without the payment of any royalties thereon or therefor.

The present invention relates to a dissolved water analyzer and more particularly to a dissolved water analyzer for monitoring the dissolved water contents of various liquids in which water is relatively insoluble, such as kerosene, gasoline, carbon tetrachloride, naptha, heating fuels, and the like.

At the present time, the standard method of analysis for measuring dissolved water content in liquids which water is relatively insoluble is the Carl Fischer titration, which is described in ASTM Standards of Petroleum Products and Lubricants, designation D1364-58 which appears on page 784 of part 7, 1958 standards published by the American Society for Testing Materials, Philadelphia. Pa. This method requires very careful and precise sampling techniques, particularly when the water content is either very low or very high relative to the saturation value of the particular liquid involved, to prevent moisture being added to or removed from the sample due to contact with the atmosphere. The Fischer titration also is tedious and time consuming, its accuracy depends on reaching an end point which is usually fleeting and subject to considerable variations and interpretations by different analysts.

Other methods have been proposed wherein both the air and liquid streams make a single pass through a packed column. Equilibrium is not reached in this manner, and the accuracy is directly dependent upon the maintenance of precise flow rates from air and liquid, and upon a continuous supply of external air of unvarying moisture content. Since precise flow rates difficult to maintain and the moisture content of the air supplied is subject to change, this method suffers from inherent inaccuracy.

The present invention may be used to continually monitor liquid streams in pipe lines or alternatively may be used to measure dissolved water in random samples. It completely eliminates the sampling errors mentioned above since the sample stream does not contact the atmosphere.

The apparatus of this invention is applicable to all liquids having a dissolved water content which follows Henry's law for solutions. In all such systems, moisture content of the liquid at a given temperature is directly proportional to the partial pressure of the water in the air which is in equilibrium with it. When this air is saturated with water (relative humidity equals 100%), the liquid will also be saturated. Similarly if the liquid is only 20% saturated, the relative humidity of the air will only be 20%.

The system of this invention recirculates trapped air through a sample of the liquid to be tested thereby insuring that the relative humidity of the air is the same as that of the sample liquid, since there is no contact with the atmosphere outside of the system. A hygrometer is employed to measure the relative humidity of the air in the system after equilibrium has been reached.

It is therefore an object of this invention to provide a dissolved water analyzer which is accurate but relatively simple to operate.

Another object of this invention is the provision of a dissolved water analyzer for monitoring the water content of liquids in which water is relatively insoluble.

Still another object of this invention is the provision of a system, which is free from contamination of the atmosphere, for measuring dissolved water content of liquids.

Other objects and many of the attendant advantages of this invention will be readily appreciated as the same becomes better understood by reference to the following detailed description when considered in connection with the accompanying drawings in which the FIGURE shows a preferred embodiment of the present invention in diagrammatic form.

There is shown in the figure a chamber 2 through which the sample liquid 10 is passed. The sample liquid enters the chamber through the liquid inlet tube 1 and leaves the chamber through the liquid outlet 3. Since the system is closed to the atmosphere air is entrapped above the level of liquid 10 in chamber 2. Syphoning is prevented by an air vent 4 opposite outlet 3.

A pump 11, run by a motor 12, pumps the trapped air through the system, removing it from contact chamber 2 through tube 5 and pumping it back through bubbler tube 13 to a point well below the surface of the sample liquid 10 in contact chamber 2, thereby insuring that the air-bubbles 15 make intimate contact with the liquid 10. A chamber 6 is provided in air outlet 5. Chamber 6 is provided with a valve 9 which is opened to atmospheric pressure while the contact chamber 2 is being filled with this sample liquid 10 to allow the trapped air to remain at atmospheric pressure. Inside chamber 6 is a hygrometer sensing element 7 to which is connected an indicator 8. A thermometer 14 is provided at the top of the chamber 2 for measuring the temperature of the air within the chamber.

Thus the relative humidity of the recirculating air is measured continuously by means of a detector element 7 located in chamber 6 and the reading is indicated on indicator 8. A constant reading on indicator 8 indicates that equilibrium between liquid and air has been reached. This reading taken in conjunction with the air temperature indicated by the thermometer T is used to measure the percent of saturation of the recirculated air and hence of the liquid which is in equilibrium with this air. The actual dissolved water content of the liquid may be calculated simply by applying the percent of saturation to the known solubility of water in the liquid at the particular temperature measured. The speed at which the indicator 8 responds to changes in water content depends primarily upon the nature and the amount of surface area contacted by the circulating air, including the surfaces of the contact chamber, tubing, pump, etc. For maximum response speed, the size of the entire assembly should be kept to a minimum, while the rate of air and liquid flow should be as large as possible, without causing entrainment of mist into the detection chamber 6. The ultimate accuracy of the device is unaffected by these flow quantities and depends only on the achievement of complete equilibrium between air and liquid.

A practical embodiment of the device using a glass contact chamber 6" tall and 2" in diameter and an Aminco-Dunmore humidity indicator with a single Dunmore cell gave a response which was 93% of the final reading in 3 minutes when the water content of the sample liquid was varied between 80% and 5% of saturation. Where large changes in water content were anticipated, it was found that a multiple head sensing element which covers a range of relative humidity about 4% to 96% is practical. However, greater accuracy and quicker response is obtained by the use of a single cell of smaller range, where only small and gradual changes in water content are anticipated.

Thus there has been described a system which accurately measures the dissolved water content in various liquids in which water is relatively insoluble. Since accurate determination of the dissolved water content may be very important in quality control for fuels, in particular aircraft fuels, the system herein disclosed represents a substantial saving in time while yielding results comparable to the complicated laboratory procedures previously used. The system may also be used with known equipment to provide automatic control of dehydration systems in various fields.

Obviously many modifications and variations of the present invention are possible in the light of the above teachings. It should be understood of course that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. A system for continuously monitoring the water content of a liquid comprising a contact chamber normally closed to the atmosphere and having liquid inlet means and liquid outlet means, said inlet means and outlet means being arranged to partially fill said chamber with said liquid thereby trapping air above the level of the liquid in said chamber, means for forcing said air through said liquid in intimate contact therewith, said means for forcing said air comprising a circuit including an air outlet tube connected to said chamber above the surface of said liquid, an air pump, and an air return tube extending a substantial distance below the surface of said liquid, and hygrometer means connected in said circuit for determining the percent saturation of said air whereby the water content of said air may be calculated.

2. A system for continuously monitoring the water content of a liquid as defined in claim 1 wherein said air outlet tube has an enlarged portion and said hygrometer means comprises a hygrometer sensing element located in said enlarged portion and an indicating device connected to said sensing element.

References Cited in the file of this patent

UNITED STATES PATENTS

| | | |
|---|---|---|
| 2,175,833 | Fulton et al. | Aug. 23, 1955 |
| 2,762,218 | Ohlheiser | Sept. 11, 1956 |
| 2,918,815 | Lewis | Dec. 29, 1959 |
| 2,967,084 | Reitz | Jan. 31, 1961 |

FOREIGN PATENTS

| | | |
|---|---|---|
| 1,154,078 | France | Oct. 28, 1957 |